Dec. 26, 1933.  H. DECKEL ET AL  1,941,292
PHOTOGRAPHIC SHUTTER
Filed Sept. 15, 1932  3 Sheets-Sheet 1

Inventors
Hans Deckel
Michael Burger
By Edward H. Cumpston
Their Attorney

Dec. 26, 1933. H. DECKEL ET AL 1,941,292
PHOTOGRAPHIC SHUTTER
Filed Sept. 15, 1932 3 Sheets-Sheet 2

Inventors
Hans Deckel
Michael Burger
By Edward H. Cumpston
their Attorney

Inventors
Hans Deckel
Michael Burger
By Edward H. Cumpston
their Attorney

Patented Dec. 26, 1933

1,941,292

UNITED STATES PATENT OFFICE 1,941,292

PHOTOGRAPHIC SHUTTER

Hans Deckel, Solln, near Munich, and Michael Burger, Munich, Germany, assignors to Friedrich Deckel, Munich-Ludwigshohe, Germany Application September 15, 1932, Serial No. 633,314, and in Germany August 4, 1931

29 Claims. (Cl. 95—63)

This invention relates to photographic shutters, and especially to shutters of the so-called "automatic" type, in which both the setting and the release of the shutter are accomplished by movement of a single member in a single direction, although some features of the invention are applicable also to shutters of the so-called "set" type which require to be separately set before they may be released to make an exposure.

An object of the invention is the provision of a simplified automatic shutter of few parts and sturdy construction, easy and comparatively inexpensive to build and satisfactory in operation.

Another object of the invention is the provision of an automatic shutter having integral or built-in pre-timing mechanism for delaying the beginning of an exposure.

Another object of the invention is the provision of an automatic shutter which is simple and compact but which nevertheless is capable of relatively high speed operation.

Still another object is the provision of an automatic shutter in which relatively small resistance need be overcome in making the release part of the movement of the operating member, so that danger of jarring the shutter during the making of an exposure is greatly reduced.

A further object is the provision of timing mechanism of novel and improved design and embodying advantageous details capable of application both to set shutters and to automatic shutters.

A still further object is the provision of timing mechanism in which the operation thereof can be varied within relatively great limits by simple means.

To these and other ends the invention resides in certain improvements and combinations of parts, all as will be hereinafter more fully described, the novel features being pointed out in the claims at the end of the specification.

In the drawings.

The same reference numerals throughout the several views indicate the same parts.

Figure 1:
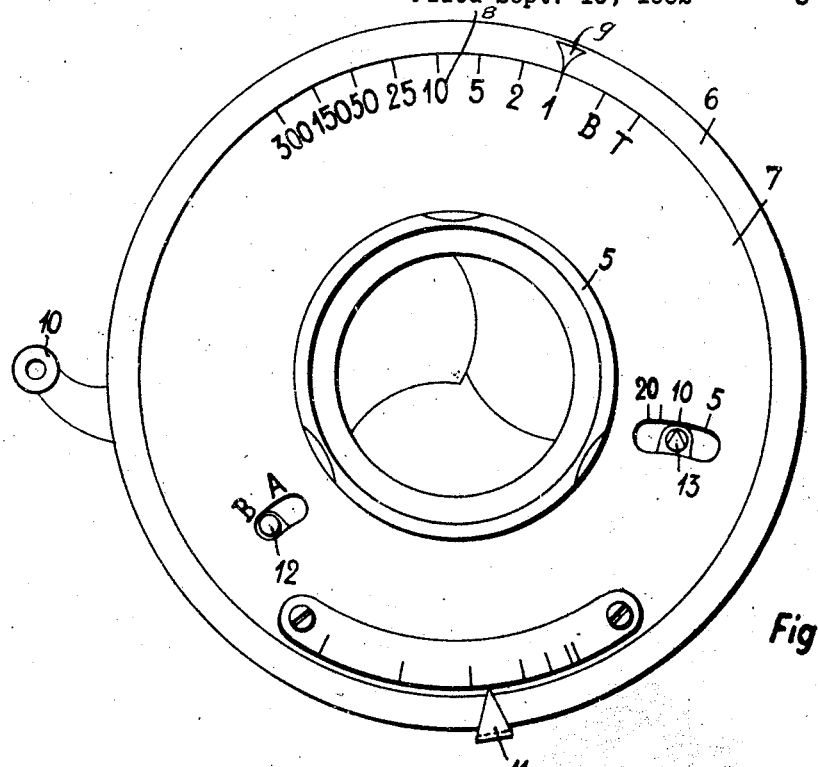
Fig. 1 is a front view of a shutter constructed in accordance with a preferred embodiment of the invention.

Referring now to the drawings which show a shutter in somewhat diagrammatic form, omitting well known parts which do not form part of the present invention, the shutter housing comprises a back plate 1 having a forwardly extending annular rim 2 at its outer edge and a rearwardly extending annular wall 3 which may form a rear lens tube. Within the housing is a base plate 4 forming an annular partition spaced from the back plate 1, and having a lens opening or exposure aperture surrounded by the forwardly extending flange 5 forming the front lens tube. The shutter blades 35, as well as the blades of an iris diaphragm or other suitable device for changing the aperture of the lens, may be positioned in the space between the back plate 1 and the base plate 4.

A setting or adjusting disk 6 overlies the front edge of the side wall 2 of the casing and is rotatably mounted on the lens tube 5. It is held in position by the cover plate 7 fixed to the lens tube in any suitable manner, such as by a bayonet joint arrangement. The cover plate carries a scale 8 indicating the different kinds of exposure for which the shutter is adapted, which cooperates with an index mark 9 on the adjusting or setting disk so that when the disk 6 is turned to determine any particular kind of exposure, the index 9 will show by reference to the scale 8 the kind of exposure for which the setting disk is set. The shutter is provided with an operating lever 10 which, by a single movement in a single direction, both sets and releases the shutter. It also has an indicator 11 cooperating with a suitable scale on the cover plate and effective, by moving the indicator, to change the aperture of the iris diaphragm or other stop device. A pin 12, also visible from the front of the shutter as shown in Fig. 1, serves as an operating member and indicator for the connection or disconnection of the pre-timing mechanism. There is also an indicating and adjusting member 13 for varying the operation of the pre-timing mechanism.

Figure 6:
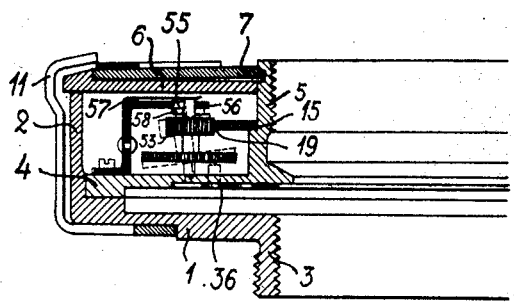
Fig. 6 is a substantially radial section through a part of the pre-timing mechanism.

The opening and closing movements of the shutter blades 35 are effected in known manner by an annular member or blade ring 36 (Fig. 6) on the rear of the base plate 4, which ring is provided with an operating pin extending through the base plate to the front thereof in position to be engaged and operated by a bell crank lever 38 (Figs. 3 and 4) which carries an upstanding projection 40. The bell crank lever 38 is operated to open and close the blades by a master member mounted for oscillation about an axis within the lens opening or exposure aperture of the shutter. Preferably, such master member is in the form of an annular ring as shown at 15, mounted on the lens tube 5 for oscillation about the center of the tube as an axis. Such a master member is believed to be new in a shutter of the automatic type, and is particularly advantageous since the extent of movement of a member mounted in this way may be materially greater, for the same size of shutter, than the extent of movement of a master member of the lever form heretofore commonly employed in automatic shutters.

Figure 3:
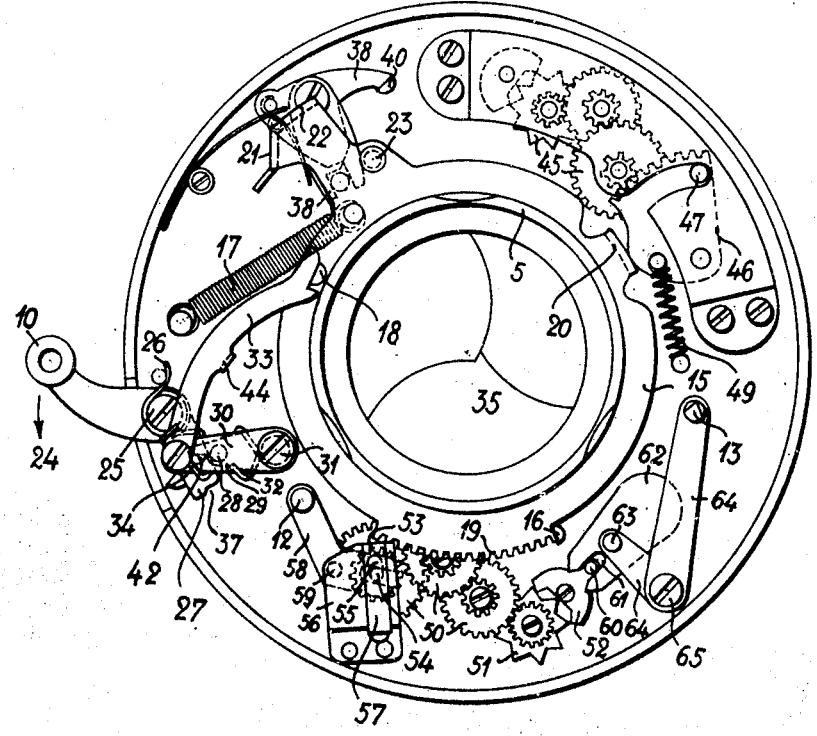
Fig. 3 is a similar view with the setting or adjusting disk also removed to show the inner parts of the shutter, which is illustrated in its normal position of rest.
Figure 4:
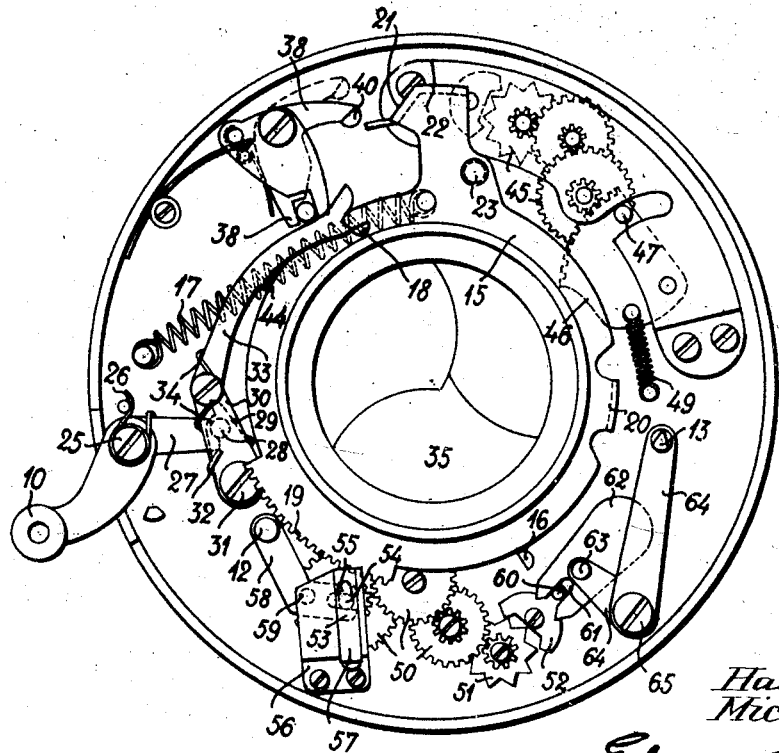
Fig. 4 is a similar view with the parts in a different position, the setting movement being completed and the parts being ready to be released by continued movement of the operating member, and the pre-timing mechanism being ineffective.

On the master member 15 there is a projection having a control edge 21—22, as plainly shown in Figs. 3 and 4, for contacting with the projection 40 on the bell crank lever 38 in such manner that during the counterclockwise movement of the master member 15, the control edge 21—22 turns the bell crank lever 38 and opens the shutter blades. Upon continued counterclockwise movement of the master member, a projection 40 on the bell crank lever rides off of the edge 22 of the master member and the shutter blades are closed partly under the influence of their own spring and partly by contact of the pin 23 on the master member with the bell crank lever.

The master member is provided with motor means such as the spring 17 tending to move the master member in a counterclockwise direction until it comes to rest against the stop 16. The master member also carries a pin 18 to which force is transmitted for setting the master member, as will be described below, and also is provided with gear teeth 19 for cooperation with timing mechanism to produce a pre-timed or delayed exposure, as described below. It also has a cam 20 for cooperating with timing mechanism to determine the length of an exposure.

Figure 2:
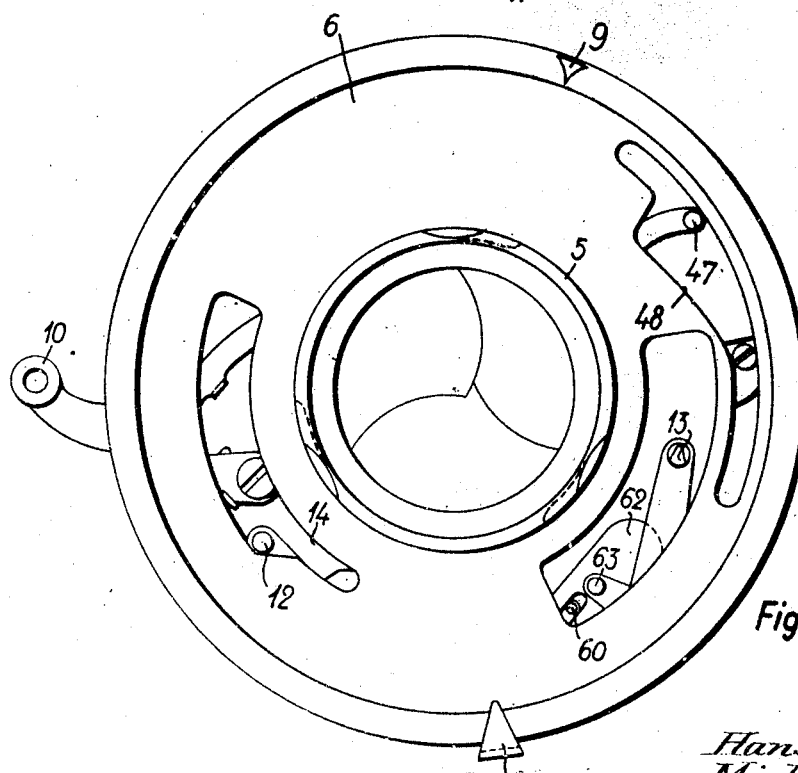
Fig. 2 is a similar view with the cover plate removed to show the setting or adjusting disk.

The setting and release of the master member are accomplished in the manner best shown in Figs. 3 and 4. The operating lever 10 is mounted for oscillation on a shaft 25 and is influenced by a spring 26 tending to turn it in a clockwise direction to the position of rest shown in Figs. 1 to 3 inclusive. An arm 27 attached to the member 10 cooperates with a pin 28 on the lever 29 mounted for oscillation on the shaft 31, on which another lever 30 is also mounted for oscillation. A motor spring 32, stronger than the motor spring 17, holds the two levers 29 and 30 normally in fixed position to each other, as shown in Figs. 3 and 4, so that these two levers 29 and 30 ordinarily act together as a unitary single lever.

The lever 30 carries at its free end a pawl 33 having a notched end for cooperation with the pin 18 and provided with a spring 34 tending to move the pawl in a clockwise direction.

Upon depression of the operating member or finger lever 10 in the direction of the arrow 24 in the ordinary use of the shutter for ordinary exposures, the levers 29 and 30 are swung together as a unit in a clockwise direction and the pawl 33, contacting with the pin 18 on the master member 15, forces the master member in a clockwise direction around the lens tube against the action of its motor spring 17. Toward the latter part of this movement, a downwardly bent ear 44 at an intermediate point on the pawl 33 comes into contact with the periphery of the master ring 15. Continued movement of the lever 30 tends to move the end of the pawl which is connected to this lever inwardly toward the center of the shutter, but since the ear 44 prevents inward movement of an intermediate part of the pawl, the opposite end of the pawl must move outwardly, so that it slips off of the pin 18 and thus releases the master member for a counterclockwise movement back to its initial position under the influence of its motor spring 17. Fig. 4 illustrates the parts in the position they assume just before the pawl has released the pin 18.

In the position shown in Fig. 4 when the setting of the master member is substantially completed and it is about to be released, a slight notch or depression 37 (Fig. 3) in the end of the arm 27 comes into contact with the pin 28 on the lever 29, which contact is perceptible to the touch of the operator so that he knows that the setting movement has been completed or substantially completed and that the release of the master member will follow substantially immediately if movement of the operating member 10 is completed. Consequently, this perceptible indication to the operator permits the stopping of the movement of the lever 10 at this point if desired, the friction of the pin 28 pressing against the end of the arm 27 being sufficient to hold this arm and the member 10 in this position. At any subsequent time the movement of the operating member 10 can be completed, which will release the master member and cause an exposure. With this arrangement, it is seen that the shutter can be used either as an automatic shutter or as a set shutter, at will. In the one case, the entire movement of the operating member 10 can be completed in a single movement in one direction, which will set and immediately release the master member to make an exposure. In the other case, the operating member 10 may be moved downwardly in the first instance only until the operator perceives that the pin 28 has come into contact with the notch 37. This much of the movement will be effective to set the master member, and further downward movement of the operating member 10 can be resumed at any later time, to release the master member for an exposure.

The members 30 and 33 may be considered somewhat in the nature of the links of a toggle, and it will be seen that by the time the setting action has been completed and the releasing action is about to take place, the two toggle members 30 and 33 are almost in line with each other so that the further releasing movement of the member 30 swings the member 33 aside to release the master member without pushing the member 33 forward to any substantial additional extent. With this construction the initial or setting part of the movement of the operating member 10 produces substantially all of the turning of the master member 15 and the tensioning of the motor spring 17, and the later or releasing part of the movement does not create any additional tension in the motor spring to any substantial extent. Consequently, this releasing movement of the operating member 10, when the toggle links are nearly straight, has comparatively little resistance to overcome, with the result that less force is necessary to operate the member 10 through the latter or releasing part of its movement than through the first or setting part of its movement, when the toggle-like members 30 and 33 are at a greater angle to each other and serve to tension the spring 17. Thus a smooth and easy releasing action is secured, greatly reducing the danger of jarring the shutter while making an exposure.

This desirable lessening of resistance of the operating member 10 prior to the release of the master member is also secured at least partly by other features of construction in addition to the toggle action above described. For example, it is due also to the construction of the lever arm or cam arm 27 and cooperating parts. During the early part of the movement of the operating member 10, when the motor spring 17 is mainly being tensioned, the pin 28 slides along the side of the cam arm 27 and there is a relatively low power transmission ratio between these parts. Upon continued movement, the pin 28 slides off the side of the arm 27 and engages the end of the arm. At this time, the power transmission ratio becomes higher and the resistance lower, because a given degree of movement of the arm 27 results in a less exent of movement of the pin 28 when the pin engages the end of the arm, then when it engages the side of the arm. Thus, quite independently of the toggle arrangement, the transmission ratio is altered and the resistance is decreased by reason of the shape of the arm 27 which acts somewhat as a cam on the pin 28. It is obvious that the desirable lessening of resistance could be obtained wholly by advantageous design of the arm 27 as here disclosed, or wholly by the toggle link arrangement, or partly by one and partly by the other.

Since the master member 15 is mounted for oscillation about an axis within the exposure aperture of the shutter, it may have a comparatively great extent of movement, as previously explained. Consequently, during the setting movement of the master member, the part 21 which comes into contact with the lug 40 and opens the blades, may be moved to a point materially beyond the lug 40, as shown in Fig. 4. It follows that when the master member is then released it does not immediately open the blades, but has a movement of substantial extent before the opening of the blades begins, which permits the master member to attain a substantial speed under the influence of its motor spring 17 before the actual exposure takes place. This results in an extremely rapid shutter, which is believed to be able to produce exposures of shorter duration than those produced by most of the "automatic" shutters heretofore known.

The present shutter embodies timing mechanism of novel and advantageous form and capable of use in various ways in various types of shutters. In the present instance, this timing mechanism is employed as pre-timing mechanism for delaying the beginning of an exposure. This pre-timing mechanism is effective to delay the beginning of the exposure by any desired time of from 5 to 20 seconds, for example, thus permitting the operator to operate the shutter and then place himself in front of the camera in position to have his picture taken, before the exposure itself takes place.

The pre-timing mechanism, in the present embodiment, comprises a gear train 50 of known construction terminating in an escapement gear 51 for cooperation with the vibrating escapement anchor 52 which controls the escapement in known manner. The first gear 53 of this gear train is adapted to mesh with and be driven by the gear teeth 19 on the master member 15. The shaft 54 to which the gear 53 is fixed, is mounted for lateral movement so as to bring the gear 53 into and out of engagement with the teeth 19. Preferably the lower end of the shaft 54 is mounted in a fixed bearing of such dimensions that the shaft is capable of tilting to a slight extent. The upper end of the shaft 54 is guided in a longitudinal recess 55 in a yoke or bracket 56 which may be fixed to the base plate 4. A leaf spring 57 mounted on the bracket presses downwardly on the top of the shaft 54 and serves to retain the shaft frictionally in either the position shown in full lines in Fig. 6, in which the gear 53 is engaged with the teeth 19, or in the position shown in dotted lines in the same figure, in which the shaft is tilted back so that the gear is disengaged.

For engaging the gears when pre-timing is desired, a lever 58 is mounted for oscillation with slight friction about the pivot 59 on the bracket 56, and the lever has a forked end embracing the shaft 54 as shown in the drawings. The opposite end of the lever carries the pin 12 projecting upwardly through a slot in the casing as shown in Fig. 4, to an accessible position.

It is to be noted that the slot 55 in the bracket 56, which guides the shaft 54, is not arranged radially with respect to the gear teeth 19, but is oblique to such a radius and to a tangent at the point of contact of the gears 53 and 19. The slot is at such an angle and extends in such a direction that when the master member 15 is being rotated in a clockwise direction, with the gears engaged, the pressure transmitted by the gear teeth 19 to the gear 53 tends to hold this gear still more firmly in contact with the teeth 19, but when the master member is moved in a counterclockwise direction, the pressure produced on the gear 53 is sufficient to overcome the frictional resistance of the spring 57 and of the lever 58, and to slide the shaft 54 outwardly along its slot 55 so that the gears are automatically disengaged.

Figure 5:
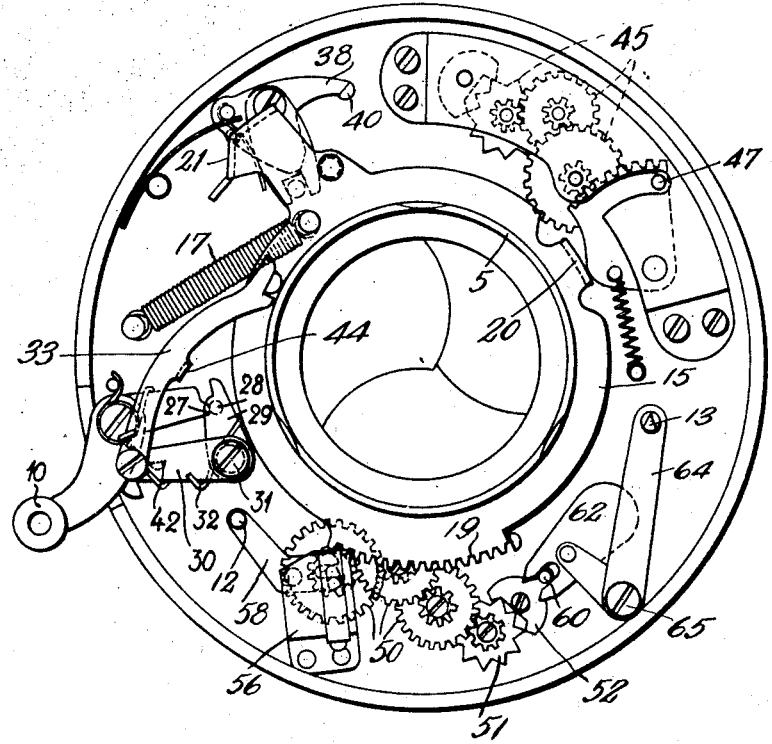
Fig. 5 is a somewhat similar view with the pre-timing mechanism in effective position and the parts set for commencing a delayed exposure.

When it is desired to use the pre-timing mechanism in order to delay the beginning of an exposure, the pin 12 is moved to the outer end of its slot (Fig. 1) to the position marked "B", which moves the shaft 54 to engage the gear 53 with the gear teeth 19 on the master member, which is then in its initial or rest position shown in Fig. 3. Then the operating member or finger lever 10 is depressed completely to the limit of its movement. Ordinarily, if the pre-timing mechanism were not engaged, such a movement of the member 10 would cause the setting and release of the master member to take place right away. When the pre-timing mechanism is effectively engaged with the master member, however, the parts operate somewhat differently. Since the resistance of the pre-timing gear train is added to the resistance of the motor spring 17, the spring 32 connecting the levers 29 and 30 to each other is no longer able to hold the members 29 and 30 in fixed position relative to each other so that the master member is moved instantly, but on the contrary, this spring 32 is stretched and tensioned as shown in Fig. 5, the member 30 momentarily remaining substantially in its initial position, while the member 29 is moved to its final release position. In this position, the great force of the pin 28 against the end of the arm 27 is sufficient to hold this arm and the finger lever 10 in the fully operated position shown in Fig. 5, even after the operator removes his finger from the member 10.

The motor spring 32, being of greater force than the motor spring 17, immediately tends to move the master member 15 clockwise to its set position, against the action of the motor spring 17. This movement is greatly slowed down and controlled by the pre-timing mechanism, so that the master member can move clockwise only as fast as is permitted by the rotation of the gear train 50, which in turn is controlled in its movement by the escapement 51—52. Finally, after a period of some seconds, the motor spring 32 succeeds in turning the lever 30 around to a position directly over the lever 29, thus not only fully setting the master member, but also releasing it for return or counterclockwise movement under the influence of the motor spring 17.

As soon as this counterclockwise rotation of the master member commences, the gear 53 of the pre-timing mechanism is immediately automatically disengaged from the gear teeth 19 by reason of the oblique inclination of the slot 55, as above explained. The master member then completes its counterclockwise rotation in the ordinary manner just as though the pre-timing mechanism had not been used, and is effective to open and close the shutter blades just as in an ordinary exposure.

During this operation, as soon as the spring 32 has swung the lever 30 far enough around to release the master member, a pin 42 on the lever 30 comes into contact with the end of the lever 29 so that the two levers 30 and 29 once more overlie each other, and the force tending to move the lever 29 in a counterclockwise direction is removed, thus relieving the pressure on the end of the arm 27 and permitting the spring 26 to shift the operating member 10 back to its initial position shown in Fig. 3, upon which movement the parts 29, 30 and 33 may also resume their initial position of rest, ready for the next exposure.

The automatic disengagement of the gear 53 from the teeth 19, during the operation of the shutter, shifts the lever 58 so that the pin 12 is at the end of its slot designated by the mark "A". Unless the pin 12 is again moved to the "B" end of its slot, the pre-timing mechanism will be ineffective at the next exposure.

Mechanism is also provided for varying the resistance of the pre-timing mechanism and thus for varying the length of the period which elapses before the exposure takes place. This mechanism is best shown in Figs. 3 and 4, and comprises a supplementary mass in the form of a lever 62 pivoted at 63 to one arm of a bell crank 64 which is pivoted at 65 to the base plate, and which has another arm carrying a pin 13 extending upwardly through a slot in the casing and cooperating with graduations adjacent the slot as shown in Fig. 1. A pin 60 on the escapement anchor 52 is engaged in a slot 61 at one end of the mass 62, which slot 61 is flared outwardly toward its open end.

By moving the pin 13 from the outside of the casing, the pivot 63 of the mass 62 can be shifted to vary the position of the slot 61 relative to the pin 60 of the anchor. When the pin 13 is moved inwardly to the limit of its motion, the mass 62 is fully engaged with the anchor 52 and is fully oscillated at each oscillation of the anchor, thus adding its mass to the mass of the anchor and effectively slowing down the oscillations of the latter to prolong the period of operation of the pre-timing mechanism. As the pin 13 is moved outwardly toward the periphery of the shutter, however, the pivot 63 of the mass 62 is moved away from the pin 60 so that the pin cooperates with a progressively wider and wider part of the slot 61, with the result that the mass is more loosely coupled to the anchor 52 and need not be moved through such a great extent at each oscillation. Thus the mass is less effective upon the anchor 52, or even completely disengaged from the anchor if desired in the extreme outward position of the pin 13, so that the operation of the pre-timing mechanism is speeded up and a less time of delay is produced.

The usual arrangements well known in the art may be provided for operating the master member from the finger lever 10 to produce "bulb" and "time" exposures. The mechanism for doing this is well known in the art and is not illustrated here. When "bulb" or "time" exposures are to be made, it is desirable that the pre-timing mechanism should not be used. To this end, a cam slot 14 (Fig. 2) is formed in the setting or adjusting disk 6 which controls the setting of the shutter for different kinds of exposures, and the pin 12 on the lever 58 extends upwardly through this slot 14. Whenever the setting disk 6 is set for ordinary instantaneous exposures, the slot 14 is sufficiently wide to permit the pin 12 to be moved to either of its two positions so that the pre-timing mechanism can be used or disused as desired. When the setting disk is set in the position for "bulb" or "time" exposures, however, (and also for extremely short instantaneous exposures, if desired) then a cam edge on the slot 14 moves the pin 12 to the disengaged position if it is not already in this position, and holds the pre-timing mechanism disengaged so that it cannot be set for effective operation.

Figure 7:
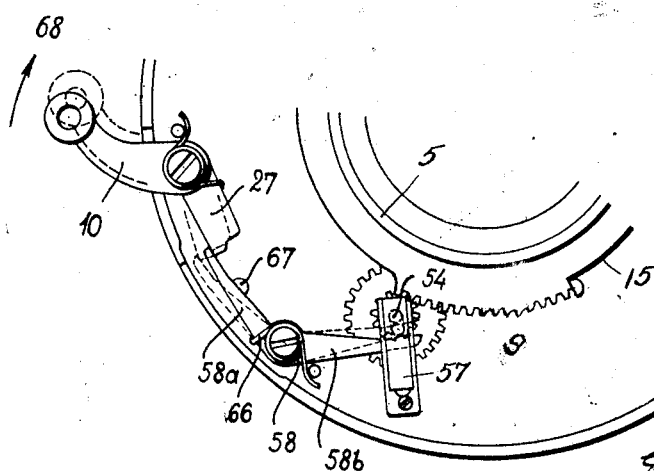
Fig. 7 illustrates a modification of the controlling means for the pre-timing mechanism.

An alternative construction for setting the pre-timing mechanism in operation is illustrated in Fig. 7. Here, instead of employing the forked lever 58 and the pin 12, there is a pivoted lever having an end 58a in position to be pressed outwardly by the arm 27, as shown in Fig. 7, and this lever also has an opposite end 58b arranged outside of the shaft 54 so that outward movement of the end 58a will cause inward movement of the end 58b and will press the end of the shaft 54 inwardly to engage the shaft 53 with the gear teeth 19. A spring 66 tends to rotate this lever in a clockwise direction until it comes into contact with the stop 67. The spring 66 is more powerful than the spring 26 which tends to move the finger lever 10 in a clockwise direction, so that the end of the lever 58a serves as a stop normally determining the position of rest of the finger lever 10.

To render the pre-timing mechanism effective, with this form of construction, the finger lever 10 is moved upwardly in the direction of the arrow 68, which overcomes the tension of the spring 66 and moves the shaft 54 inwardly to engage the gears. Then the finger lever 10 may be moved downwardly or in a counterclockwise direction to operate the shutter exactly as described above. If after setting the shutter for a pre-timing operation, the operator changes his mind and does not desire to have a delayed exposure, the pre-timing mechanism can be unset or rendered ineffective by moving the lever 10 a slight distance downwardly but not through its entire movement. This will cause a slight clockwise or setting movement of the master member 15. Then upon release of the finger lever 10, the master member 15 will move back in a counterclockwise direction and will automatically disengage the gear 53 from the teeth 19.

With this construction, the shaft 54 may be extended upwardly to cooperate with a cam surface in the setting disk 6 so as to hold the pre-timing mechanism out of engagement whenever the shutter is set for "bulb" or "time" exposures.

For varying the length of the exposure itself, suitable timing mechanism may be employed such as the gear and escapement mechanism indicated in general by the numeral 45 (Figs. 3 and 4) operated through a gear sector 46 which is moved more or less into the path of the ear 20 on the master member, to slow down the counter-clockwise return movement of the master member during the time that the lug 40 is riding on the surface 22 of the master member so that the blades are held open thereby. A pin 47 on the gear sector 46 is controlled by the cam surface 48 on the setting or adjusting disk 6, a spring 49 tending to move the gear sector to its position of maximum obstruction of the ear 20 on the master member, in known manner.

It will be seen from the foregoing description, taken in connection with the accompanying drawings, that a relatively simple shutter of novel and advantageous construction has been provided. The shutter is capable of extremely high speed operation relative to other "automatic" shutters when desired, yet it is provided with timing mechanism enabling it to make exposures of longer duration if desired, and also enabling the production of pre-timed exposures, or exposures the commencement of which is delayed a substantial time after the manual actuation of the shutter is completed. The duration of the pre-timing period may be varied at will, as well as the duration of the exposure itself. The shutter is small and compact in proportion to the size of the exposure aperture, and contains relatively few parts of simple and sturdy construction in proportion to the great number of functions and operations which it is capable of performing.

While one embodiment of the invention has been disclosed, it is to be understood that the inventive idea may be carried out in a number of ways. This application is therefore not to be limited to the precise details described, but is intended to cover all variations and modifications thereof falling within the spirit of the invention or the scope of the appended claims.

We claim:

1. A photographic shutter of the "automatic" type having an optical aperture and shutter blades for opening and closing the aperture, comprising a master member mounted for oscillation about an axis within said aperture for operating said shutter blades, means including a setting and releasing member effective both to set and to release said master member by a single movement of said setting and releasing member, and mechanism for retarding movement of said master member prior to the opening of said shutter blades, to produce a delayed exposure.

2. A photographic shutter of the "automatic" type having an optical aperture and shutter blades for opening and closing the aperture, comprising a master member mounted for oscillation about an axis within said aperture for operating said shutter blades, means including a setting and releasing member effective both to set and to release said master member by movement of said setting and releasing member in a single direction, and mechanism for retarding movement of said master member prior to the opening of said shutter blades, to produce a delayed exposure.

3. A photographic shutter of the "automatic" type having a substantially circular optical aperture and shutter blades for opening and closing said aperture, comprising a ring shaped master member mounted for oscillation about an axis substantially concentric with that of said aperture for operating said shutter blades, motor means tending to turn said master member in one direction, means including a setting and releasing member effective upon movement of said setting and releasing member in a single direction both to set said master member by moving it against the action of said motor means and to release the set master member for movement by said motor means, and mechanism for retarding movement of said master member in its setting direction to produce a delayed or pre-timed exposure.

4. A photographic shutter of the "automatic" type having an optical aperture and shutter blades for opening and closing the aperture, comprising a master member mounted for oscillation about an axis within said aperture and effective to open said shutter blades at a predetermined point during an oscillation in one direction, motor means tending to turn said master member in said one direction, and means including a setting and releasing member effective upon movement of said setting and releasing member in a single direction both to turn said master member against the action of said motor means to a position materially beyond said predetermined point, and then to release said master member for return movement under the influence of said motor means, the setting of the master member to a position materially beyond the shutter opening point permitting the master member to attain substantial speed during the return movement before the shutter blades are operated.

5. A photographic shutter of the "automatic" type having an optical aperture and shutter blades for opening and closing the aperture, comprising a master member mounted for oscillation about an axis within said aperture for operating said shutter blades, means including a setting and releasing member effective upon movement of said setting and releasing member in a single direction both to set said master member and to release it for a shutter blade operating movement, and a controlling member also mounted for oscillation about an axis within said aperture for controlling operation of said master member.

6. A photographic shutter comprising shutter blades, a master member movable in one direction to condition it for a blade operating movement and movable in a reverse direction for operating the shutter blades, and retarding means effective to retard said master member during said conditioning movement.

7. A photographic shutter comprising shutter blades, a master member movable in one direction to condition it for a blade operating movement and movable in a reverse direction for operating the shutter blades, and retarding means effective to retard said master member during both said conditioning movement and said blade operating movement.

8. A photographic shutter comprising shutter blades, a master member movable in one direction to condition it for a blade operating movement and movable in a reverse direction for operating the shutter blades, retarding means effective to retard said master member during said conditioning movement, and means for automatically rendering said retarding means ineffective during said blade operating reverse movement of said master member.

9. A photographic shutter comprising shutter blades, a master member movable in one direction to condition it for a blade operating movement and movable in a reverse direction for operating the shutter blades, motor means tending to move said master member in said blade operating reverse direction, other motor means for moving said master member in said conditioning direction against the action of said first named motor means, and retarding means effective to retard movement of said master member under the influence of said other motor means.

10. A photographic shutter comprising shutter blades, a master member movable in one direction to condition it for a blade operating movement and movable in a reverse direction for operating the shutter blades, retarding means for slowing down movement of said master member to delay the beginning of an exposure, and means for rendering said retarding means effective independently of the extent of movement of said master member.

11. A photographic shutter comprising shutter blades, a master member movable in one direction to condition it for a blade operating movement and movable in a reverse direction for operating the shutter blades, retarding means for slowing down movement of said master member to delay the beginning of an exposure, an operating member for causing movement of said master member, and means other than said operating member and independent of the extent of movement of said master member for operatively connecting said retarding means to said master member.

12. A photographic shutter comprising shutter blades, a master member movable in one direction to condition it for a blade operating movement and movable in a reverse direction for operating the shutter blades, retarding means for slowing down movement of said master member to delay the beginning of an exposure, an operating member for causing movement of said master member, and means operable by said operating member and independent of the extent of movement of said master member for operatively connecting said retarding means to said master member.

13. A photographic shutter comprising shutter operating mechanism, pre-timing mechanism operatively connectable to and disconnectable from said shutter operating mechanism and effective when operatively connected to cause a delayed exposure, controlling means settable to different positions to determine different kinds of exposures including "bulb" and "time" exposures, and means insuring operative disconnection of said pre-timing mechanism when said controlling means is set for "bulb" or "time" exposures.

14. A photographic shutter comprising shutter blades, a master member for operating said shutter blades, pre-timing mechanism operatively connectable to and disconnectable from said master member and effective when operatively connected to cause a delayed exposure, controlling means settable to different positions to determine different kinds of exposures including "bulb" and "time" exposures, and means independent of movement of said master member for insuring operative disconnection of said pre-timing mechanism from said master member when said controlling means is set for "bulb" or "time" exposures.

15. A photographic shutter comprising shutter blades, a master member movable through a part of its movement to operate said blades to cause an exposure and movable through another part of its movement to pre-time the exposure, motor means for driving the master member through the exposure causing part of its movement, and other motor means for driving the master member through the pre-timing part of its movement.

16. A photographic shutter comprising a casing, a master member movable within said casing, timing mechanism within said casing, said mechanism including an escapement anchor, a supplementary mass capable of being engaged with said anchor to slow down operation thereof, and means accessible from outside said casing and independent of movement of said master member for coupling said supplementary mass with said anchor in a plurality of varying degrees to produce a plurality of different retarding effects upon said anchor.

17. A photographic shutter comprising timing mechanism for timing operation of said shutter, said timing mechanism including an escapement anchor, a supplementary swinging mass, and adjusting means for engaging said mass with said anchor to a plurality of different extents so that said mass may produce different effects upon said anchor.

18. A photographic shutter comprising a master member, a movable operating member for both setting and releasing said master member, and means interconnecting said master member and said operating member to set and release the master member by movement of said operating member, said means including toggle-like members arranged to move from a substantially angular position toward a straight-line position as movement of said operating member progresses, so as to reduce the force needed to actuate said operating member toward the end of the movement of the operating member.

19. A photographic shutter comprising a master member, an operating member effective upon movement in a single direction first to set and then to release said master member, and means including toggle-like members interconnecting said master member and said operating member in such manner that said members move from a substantially angular positon toward a straight-line position as movement of said operating member progresses, so that the force required to move said operating member is perceptibly less during the release part of said movement than during the setting part of the movement, so that the liability of jarring the shutter while making an exposure is reduced.

20. A photographic shutter comprising a blade operating master member movable in one direction to set the member for a subsequent exposure movement and movable in an opposite direction to produce an exposure, an operating member effective upon movement in a single direction first to set said master member and then to release said master member for movement in said opposite direction, and means providing an indication perceptible to the sense of touch substantially at the end of the setting part and beginning of the release part of the movement of said operating member.

21. A photographic shutter comprising a master member, optionally operative pre-timing mechanism effective when operative to cause a delayed beginning of an exposure, an operating member movable to set and release said master member, means tending to move said operating member away from release position, and frictional means effective during at least part of the time when said pre-timing mechanism is effective to hold said operating member in its release position.

22. A photographic shutter comprising shutter blades, a master member movable in one direction to condition it for a blade operating movement and movable in a reverse direction for operating the shutter blades, gear teeth associated with said master member, retarding means effective to retard said master member during said conditioning movement, said retarding means including a gear engaging said gear teeth associated with said master member during said conditioning movement of said master member, and mounting means for said gear permitting said gear to move into and out of engagement with said gear teeth in a direction oblique to a tangent at the point of engagement, so that when said master member moves in said reverse direction, said gear will tend to move obliquely away from said gear teeth and to be disengaged therefrom.

23. A photographic shutter comprising shutter blades, a master member for operating said shutter blades, gear teeth associated with said master member and movable back and forth in opposite directions, and timing mechanism including a gear mounted for movement into and out of engagement with said gear teeth in a direction oblique to a tangent at the point of engagement, so that when said gear is engaged, movement of said gear teeth in one direction will tend to engage the gear more firmly with the gear teeth, and movement of said gear teeth in the opposite direction will tend to disengage said gear from said gear teeth.

24. A photographic shutter comprising timing mechanism for timing operation of said shutter, said timing mechanism including an oscillating escapement anchor member, a supplementary mass member pivoted for oscillation about an axis, means for coupling said mass member to said anchor member so that said mass member tends to retard oscillation of said anchor member, said coupling means including a slot in one of said members and a pin on the other of said members for engaging said slot, and adjusting means for shifting said axis of oscillation of said mass member toward and away from said anchor member to vary the position of said pin in said slot and thereby to produce different ranges of movement of said mass member for predetermined oscillating movements of said anchor member, to vary the retarding effect produced upon said anchor member by said mass member.

25. A photographic shutter comprising shutter blades, a master member movable in one direction to condition it for a blade operating movement and movable in a reverse direction for operating the shutter blades to make an exposure, said blades remaining substantially stationary in closed position during the conditioning movement of said master member, power means energized by said conditioning movement of said master member and effective, when said master member is released, to move it in said reverse direction, and a movable operating member for both conditioning and releasing said master member upon a single movement in a single direction, said single movement of said operating member having a portion effective to condition said master member and energize said power means, and another portion effective, after further movement in the same direction without further substantial energizing of said power means, to release said master member.

26. A photographic shutter comprising shutter blades, a master member movable in one direction to condition it for a blade operating movement and movable in a reverse direction for operating the shutter blades to make an exposure, said blades remaining substantially stationary in closed position during the conditioning movement of said master member, power means energized by said conditioning movement of said master member and effective, when said master member is released, to move it in said reverse direction, and a movable operating member movable against relatively high resistance during one part of its movement and movable against relatively low resistance during a later part of a single movement in a single direction, said operating member being effective to condition said master member and energize said power means during said high resistance part of its movement and to release said master member during and after the beginning of said low resistance part of its movement.

27. A photographic shutter comprising shutter blades, a master member movable in one direction to condition it for a blade operating movement and movable in a reverse direction for operating the shutter blades to make an exposure, said blades remaining substantially stationary in closed position during the conditioning movement of said master member, power means energized by said conditioning movement of said master member and effective, when said master member is released, to move it in said reverse direction, a manually shiftable operating member movable against resistance for first conditioning and then releasing said master member by a single movement in one direction, and means for decreasing the resistance to movement of said operating member at a point in each said movement before the release of said master member occurs.

28. A photographic shutter comprising shutter blades, a master member movable in one direction to condition it for a blade operating movement and movable in a reverse direction for operating the shutter blades to make an exposure, said blades remaining substantially stationary in closed position during the conditioning movement of said master member, power means energized by said conditioning movement of said master member and effective, when said master member is released, to move it in said reverse direction, a manually shiftable operating member for first conditioning and then releasing said master member, and means for holding said master member and operating member stationary against action of said power means at a position near the end of said conditioning movement of said master member and before the release thereof.

29. A shutter according to claim 28 in which said means for holding said master member and operating member includes a part connected to and moved by said operating member, a second part moved by said first mentioned part and operatively connected to said master member, and a depression in one of said parts in which the other of said parts may engage when said master member nears the end of its conditioning movement.

HANS DECKEL.
MICHAEL BURGER.